United States Patent
Wu et al.

(10) Patent No.: US 11,418,303 B2
(45) Date of Patent: Aug. 16, 2022

(54) RESOURCE MAPPING METHOD FOR DEMODULATION REFERENCE SIGNAL AND BASE STATION

(71) Applicant: VIVO MOBILE COMMUNICATION CO., LTD., Chang'an Dongguan (CN)

(72) Inventors: Kai Wu, Chang'an Dongguan (CN); Yu Ding, Chang'an Dongguan (CN); Xiaodong Shen, Chang'an Dongguan (CN); Na Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 144 days.

(21) Appl. No.: 16/608,981

(22) PCT Filed: Apr. 27, 2018

(86) PCT No.: PCT/CN2018/084814
§ 371 (c)(1),
(2) Date: Oct. 28, 2019

(87) PCT Pub. No.: WO2018/196849
PCT Pub. Date: Nov. 1, 2018

(65) Prior Publication Data
US 2020/0195401 A1 Jun. 18, 2020

(30) Foreign Application Priority Data
Apr. 28, 2017 (CN) .......................... 201710294709.0

(51) Int. Cl.
*H04L 5/00* (2006.01)
*H04L 25/02* (2006.01)
*H04L 27/26* (2006.01)

(52) U.S. Cl.
CPC .......... *H04L 5/0048* (2013.01); *H04L 5/0007* (2013.01); *H04L 25/0202* (2013.01); *H04L 27/2613* (2013.01); *H04L 27/2662* (2013.01)

(58) Field of Classification Search
CPC . H04L 5/0048; H04L 5/0007; H04L 25/0202; H04L 27/2613; H04L 27/2662
See application file for complete search history.

(56) References Cited

U.S. PATENT DOCUMENTS

| 2015/0237602 A1 | 8/2015 | Chae et al. |
| 2015/0341908 A1 | 11/2015 | Wang et al. |

(Continued)

FOREIGN PATENT DOCUMENTS

| CN | 103906139 A | 7/2014 |
| CN | 104009831 A | 8/2014 |

(Continued)

OTHER PUBLICATIONS

Samsung, "NR-PBCH designs", 3GPP TSG-RAN WG1 #88, Athens, Greece Feb. 13-17, 2017, R1-1702905 (Year: 2017).*

(Continued)

*Primary Examiner* — Joseph A Bednash
(74) *Attorney, Agent, or Firm* — von Briesen & Roper, s.c.

(57) ABSTRACT

A resource mapping method for a demodulation reference signal (DMRS) and a base station are provided. The method includes: determining a target orthogonal frequency division multiplexing (OFDM) symbol for mapping a physical broadcast channel (PBCH)-DMRS from OFDM symbols corresponding to a new radio (NR) synchronization signal block (SS block); and mapping the PBCH-DMRS in the target OFDM symbol.

15 Claims, 13 Drawing Sheets

(56) References Cited

U.S. PATENT DOCUMENTS

2019/0124675 A1    4/2019  Gao et al.
2020/0154396 A1*  5/2020  Liu ................... H04W 56/0035

FOREIGN PATENT DOCUMENTS

CN        104662815 A    5/2015
CN        105898872 A    8/2016

OTHER PUBLICATIONS

MediaTek Inc., "TDM Based Unified SS Block Design: Signal Structure and Performance", 3GPP TSG RAN Meeting #88, Atens, Greece, Feb. 13-17, 2017, R1-1702727 (Year: 2017).*

Huawei et al., "Discussion and evaluation on broadcast channel/signals transmission for beam based initial access", 3GPP TSG RAN WG1 Meeting #88bis, Spokane, USA, Apr. 3- 7, 2017, R1-1705057 (Year: 2017).*

Nokia et al., "NR-PBCH Design", 3GPP TSG RAN WG1 Meeting #88bis, Spokane, USA, Apr. 3-7, 2017, R1-1705840 (Year: 2017).*

LG Electronics, "NR PBCH Design", 3GPP TSG RAN WG1 Meeting #87, Reno, USA Nov. 14-18, 2016 (Year: 2016).*

ZTE, ZTE Microelectronics, "Issues Related to NR-PBCH", 3GPP TSG RAN WG1 Meeting #87, Reno, USA, Nov. 14-18, 2016, R1-1611443 (Year: 2016).*

Nokia, Alcatel-Lucent Shanghai Bell, "NR-PBCH Design", 3GPP TSG-RAN WG1#87, Reno, U.S.A., Nov. 14-18, 2016, R1-1612807 (Year: 2016).*

CATT, 3GPP TSG RAN WG1 Meeting #88bis, Spokane, USA, Apr. 3-7, 2017, R1-1704537 (Year: 2017).*

Extended European Search Report related to Application No. 18791267.0 dated Mar. 27, 2020.

Samsung: "NR-PBCH designs", 3GPP Draft; R1-1702905, 3rd Generation Partnership Project (3GPP), Mobile Competence Centre; 650, Route Des Lucioles; F-06921 Sophia-Antipolis Cedex; France; vol. RAN WG1, No. Athens, Greece; 20170213-2017021, XP051210049.

Mediatek Inc: "TDM Based Unified SS Block Design: Signal Structure and Performance", 3GPP Draft; R1-1702727 TDM Based Unified SS Block Design Signal Structure and Performance Final, 3rd Generation Partnership Project (3GPP), Mobile Competence Centre; 650; Route des Lucioles; F-06921; vol. RAN WG1, No. Athens, Greece; Feb. 13, 2017-Feb. 17, 2017, XP051209874.

Huawei et al.; Discussion and evaluation on broadcast channel/signals transmission for beam based initial access, R1-1705057 3GPP TSG RAN WG1 meeting #88bis; Spokane, USA, Apr. 3, 2017-Apr. 7, 2017.

Nokia et al.; NR-PBCH Design, R1-1705840 3GPP TSG RAN WG1 Meeting #88; Spokane, WA, USA, Apr. 3, 2017-Apr. 7, 2017.

Vivo; DMRS design for NR-PBCH, R1-1707228 3GPP TSG RAN WG1 Meeting #89, Hangzhou, P.R. China May 15, 2017-May 19, 2017.

International Search Report related to Application No. PCT/CN2018/084814 dated Jul. 18, 2018.

Chinese Search Report related to Application No. 201710294709.0 dated Apr. 15, 2019.

* cited by examiner

US 11,418,303 B2

RESOURCE MAPPING METHOD FOR DEMODULATION REFERENCE SIGNAL AND BASE STATION

CROSS-REFERENCE TO RELATED APPLICATION

This patent application is a 35 USC § 371 U.S. national stage of International Application No. PCT/CN2018/084814 filed on Apr. 27, 2018, which claims a priority to Chinese Patent Application No. 201710294709.0 filed on Apr. 28, 2017, a disclosure of which is incorporated in its entirely by reference herein.

TECHNICAL FIELD

The present disclosure relates to the technical field of communication applications, and in particular, to a resource mapping method for a demodulation reference signal (DMRS) and a base station.

BACKGROUND

One new radio (NR) synchronization signal block (SS block) in an NR system consists of an NR-primary synchronization signal (PSS), an NR-secondary synchronization signal (SSS), and an NR-physical broadcast channel (PBCH), and includes orthogonal frequency division multiplexing (OFDM) symbols that are consecutive in time.

In a design of Long Term Evolution (LTE), pilot demodulation and channel estimation are performed for a PBCH based on a full-bandwidth cell-specific reference signal (CRS). However, a full-bandwidth CRS is not introduced in NR SS block design. As a result, pilot demodulation cannot be performed for a PBCH in NR. Therefore, it is necessary to design a new mapping scheme for NR-PBCH demodulation pilot.

SUMMARY

An object of the present disclosure is to provide a resource mapping method for a DMRS and a base station, to solve the problem of pilot demodulation for a PBCH in an NR SS block.

An embodiment of the present disclosure provides a resource mapping method for a DMRS, including: determining a target OFDM symbol for mapping a PBCH-DMRS from OFDM symbols corresponding to an NR SS block; mapping the PBCH-DMRS in the target OFDM symbol.

An embodiment of the present disclosure further provides a base station, including: a determining module, configured to determine a target OFDM symbol for mapping a PBCH-DMRS from OFDM symbols corresponding to an NR SS block; a mapping module, configured to map the PBCH-DMRS in the target OFDM symbol.

An embodiment of the present disclosure further provides a base station, including: a storage, a processor, and a computer program stored in the storage and configured to be executed by the processor, where the processor is configured to execute the computer program, to implement the steps in the resource mapping method for a DMRS.

An embodiment of the present disclosure further provides a computer readable storage medium storing therein a computer program, where the program is configured to be executed by a processor, to implement the steps in the resource mapping method for a DMRS.

According to the technical solutions in the embodiments of the present disclosure, a target OFDM symbol for mapping a PBCH-DMRS is determined from OFDM symbols corresponding to an NR SS block, and the PBCH-DMRS is mapped in the target OFDM symbol, so that channel estimation can be performed according to the DMRS for a PBCH in the SS block.

DETAILED DESCRIPTION

The technical solutions in embodiments of the present disclosure are described clearly and completely in conjunction with drawings in the embodiments of this disclosure. Apparently, the described embodiments are merely a part of rather than all the embodiments of this disclosure. All other embodiments obtained by a person ordinary skilled in the art based on the embodiments of this disclosure without any creative efforts fall within the protection scope of this disclosure.

The present disclosure is directed to the problem of pilot demodulation for a PBCH in an NR SS block. The present disclosure provides a resource mapping method for a DMRS and a base station, so that pilot demodulation can be performed for a PBCH in an SS block according to a DMRS in a target OFDM symbol, thereby improving the performance of channel estimation.

Figure 1:
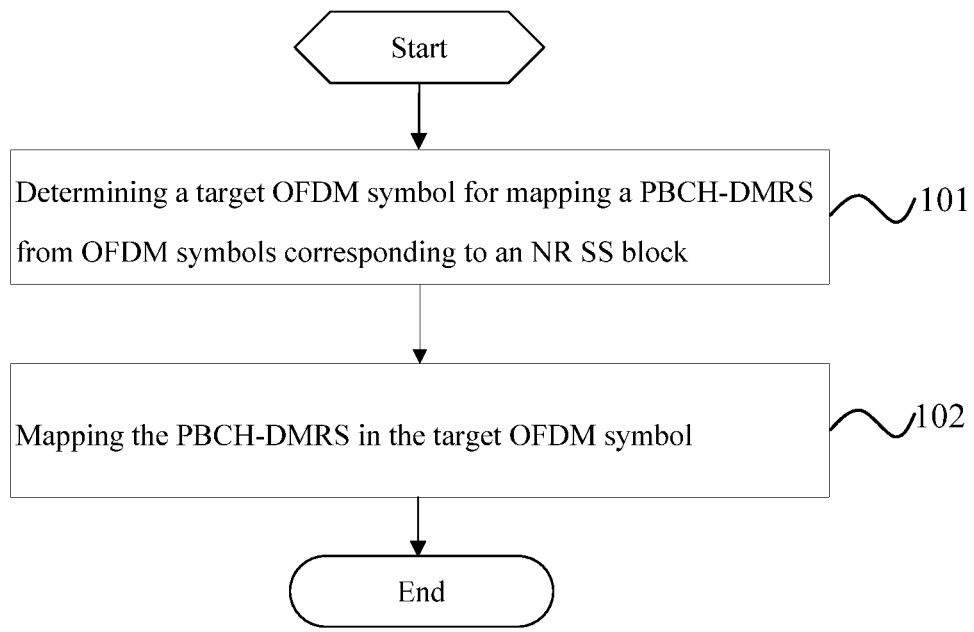
FIG. 1 is a work flow diagram of a resource mapping method for a DMRS according to some embodiments of the present disclosure.
Figure 2A:
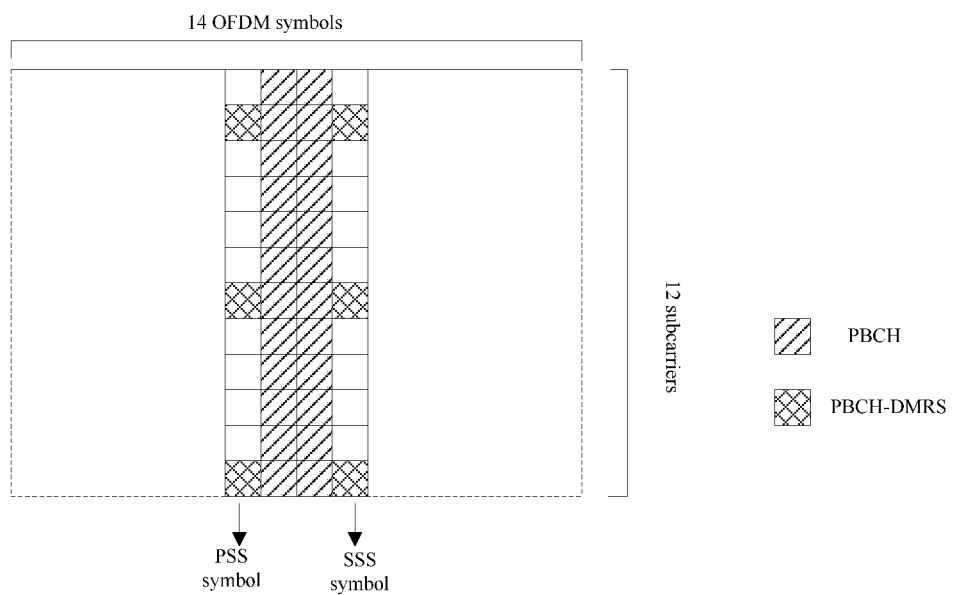
FIG. 2a is a schematic diagram of mapping a PBCH-DMRS according to some embodiments of the present disclosure.
Figure 2B:
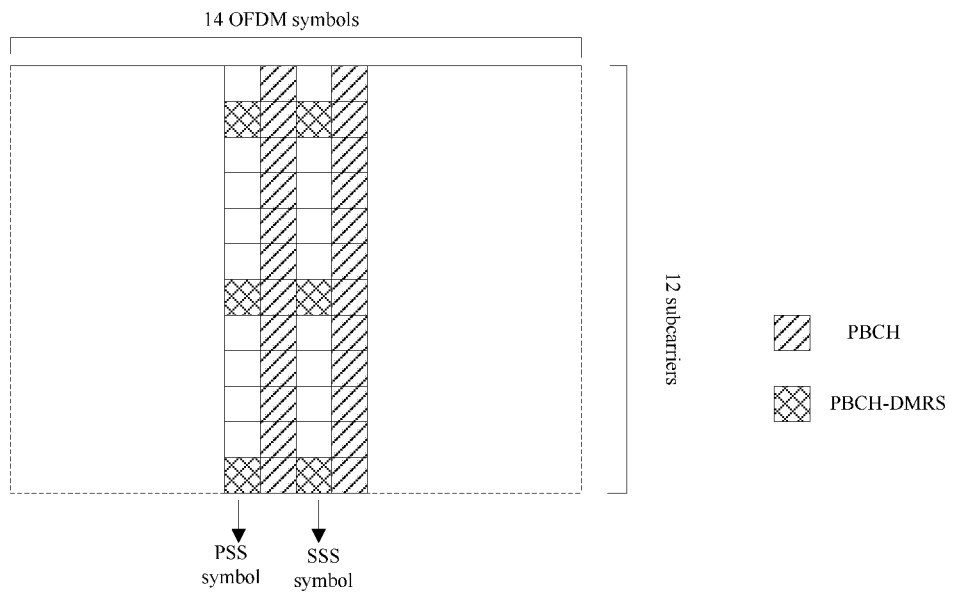
FIG. 2b is a schematic diagram of mapping a PBCH-DMRS according to some other embodiments of the present disclosure.
Figure 2C:
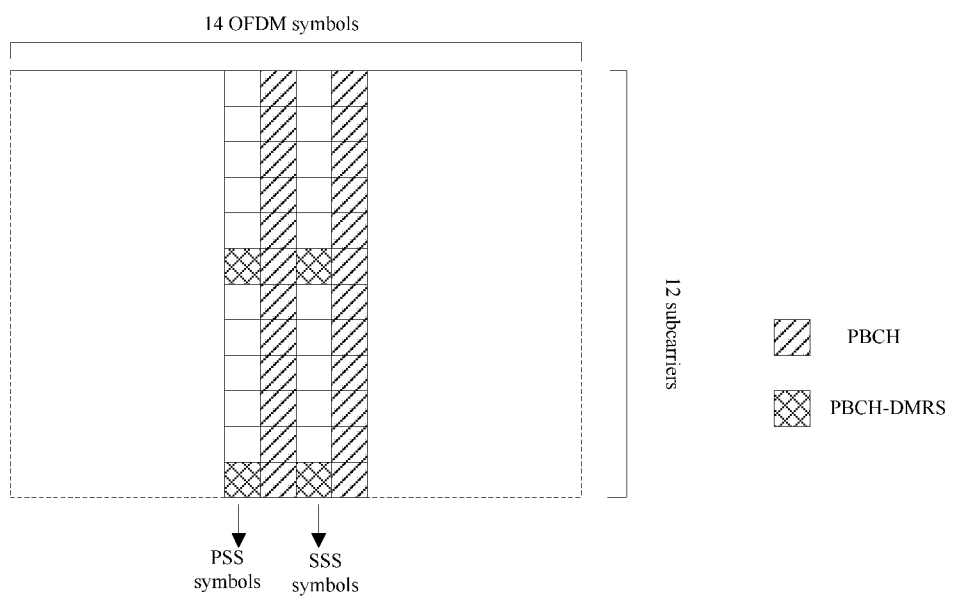
FIG. 2c is a schematic diagram of mapping a PBCH-DMRS according to some other embodiments of the present disclosure.
Figure 2D:
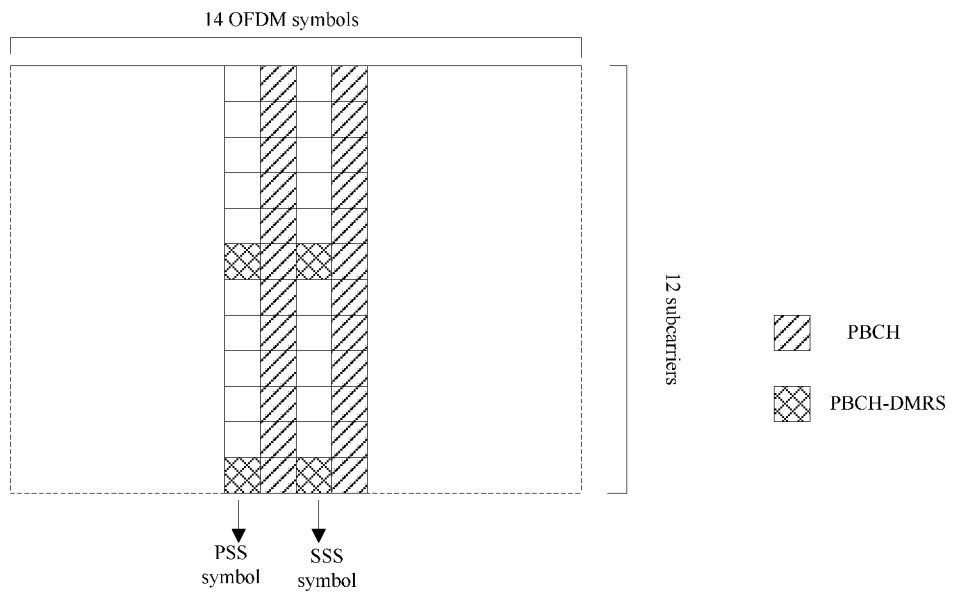
FIG. 2d is a schematic diagram of mapping a PBCH-DMRS according to some other embodiments of the present disclosure.
Figure 3A:
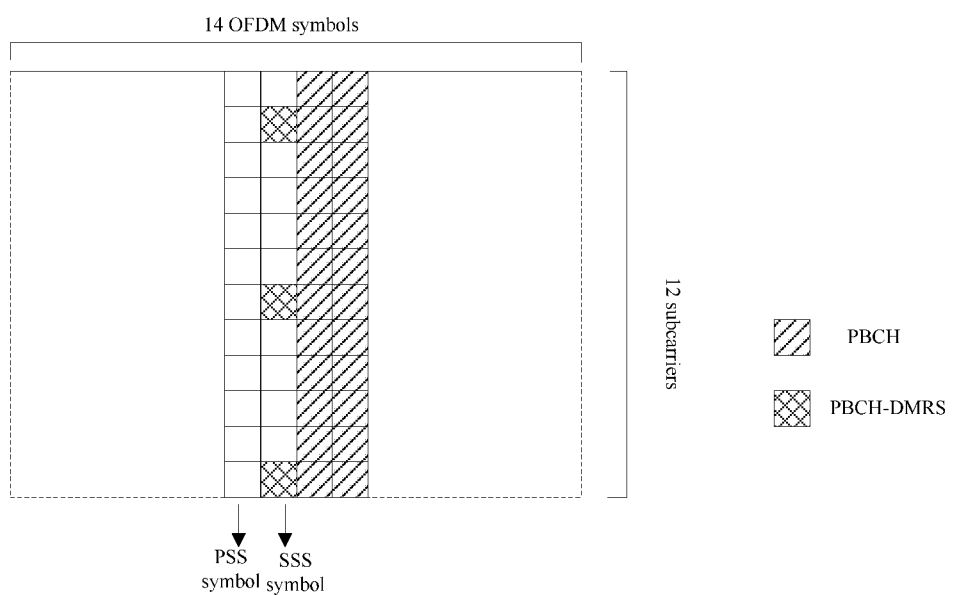
FIG. 3a is a schematic diagram of mapping a PBCH-DMRS according to some other embodiments of the present disclosure.
Figure 3B:
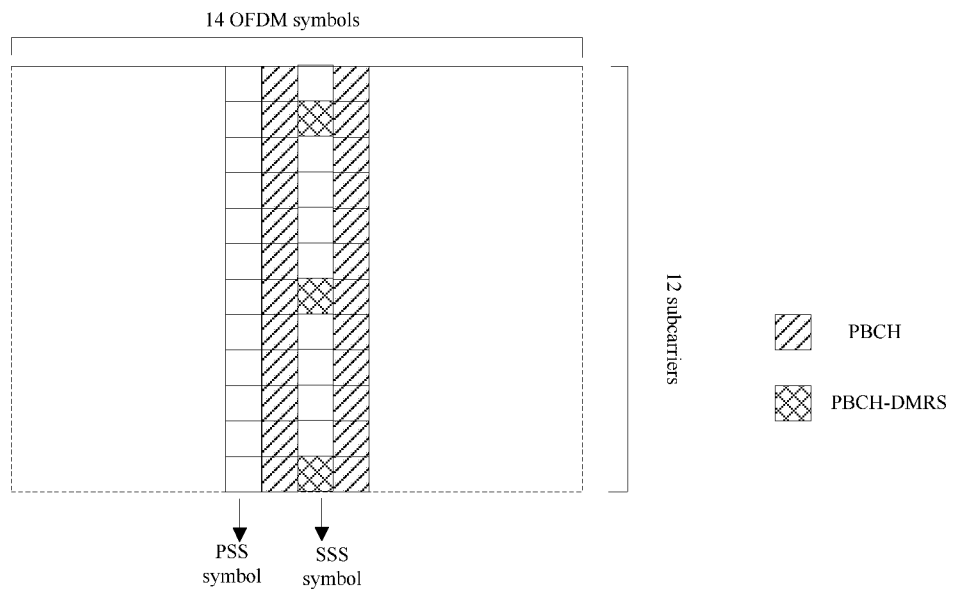
FIG. 3b is a schematic diagram of mapping a PBCH-DMRS according to some other embodiments of the present disclosure.
Figure 3C:
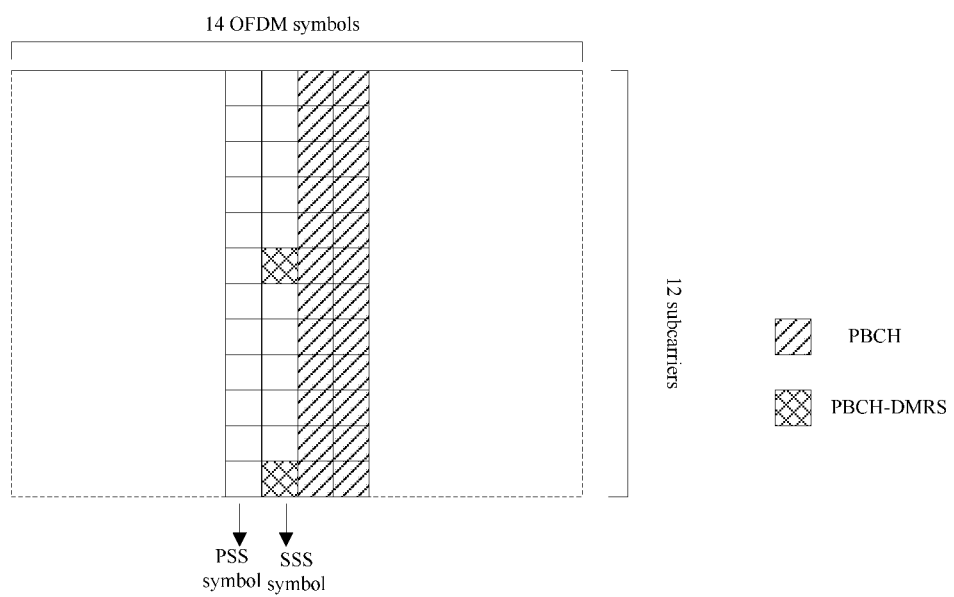
FIG. 3c is a schematic diagram of mapping a PBCH-DMRS according to some other embodiments of the present disclosure.
Figure 3D:
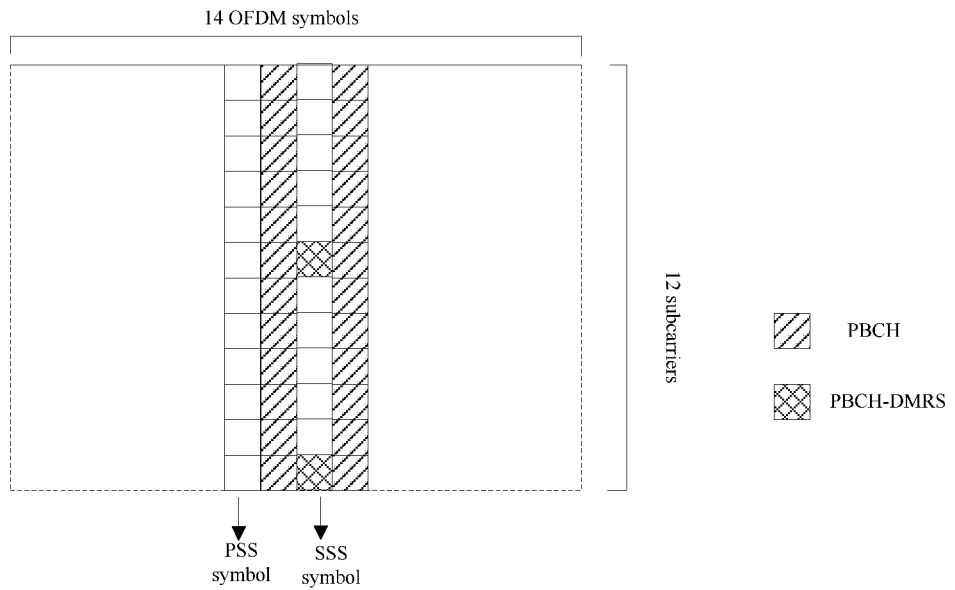
FIG. 3d is a schematic diagram of mapping a PBCH-DMRS according to some other embodiments of the present disclosure.

As shown in FIG. 1, some embodiments of the present disclosure provide a resource mapping method for a DMRS, including Step 101 and Step 102. Step 101: Determining a target OFDM symbol for mapping a PBCH-DMRS from OFDM symbols corresponding to an NR SS block.

Herein, the OFDM symbols corresponding to the NR SS block include an OFDM symbol occupied by a PSS, an OFDM symbol occupied by an SSS, and an OFDM symbol occupied by a PBCH.

Specifically, one NR SS block consists of an NR-PSS, an NR-SSS, and an NR-PBCH, and includes OFDM symbols that are consecutive in time. The PSS occupies one OFDM symbol, the SSS occupies one OFDM symbol, and the PBCH occupies two OFDM symbols.

The NR-PBCH has a bandwidth of 4.32 M and occupies 288 subcarriers. Each of the NR-PSS and the NR-SSS has a bandwidth of 2.16 M and occupies 127 subcarriers.

The NR SS block is used to obtain timing by using the NR-PSS in the SS block, obtain a cell identifier (ID) by using the NR-SSS, and obtain minimal system information by using the NR-PBCH.

In one NR SS block, the bandwidth of the NR-PSS and the bandwidth of the NR-SSS are inconsistent with the bandwidth of the NR-PBCH. As a result, OFDM symbols in which the NR-PSS and the NR-SSS are located still have unoccupied resources. The resources may be used to transmit other physical channels and physical signals.

The following description is based on the following assumption that in time domain, the NR-PSS occupies one OFDM symbol, the NR-SSS occupies one OFDM symbol, and the NR-PBCH occupies two OFDM symbols. Hereinafter, the resources of the NR SS block other than the resources occupied by the NR-PSS, the NR-SSS, and the NR-PBCH are referred to as other resources of the NR SS block.

In the foregoing step, the target OFDM symbol is determined in the SS block, to facilitate subsequent step of mapping the PBCH-DMRS in the target OFDM symbol.

Step 102: Mapping the PBCH-DMRS in the target OFDM symbol.

Herein, the target OFDM symbol is the OFDM symbol occupied by the PSS, the OFDM symbol occupied by the SSS and/or the OFDM symbol occupied by the PBCH.

By mapping the PBCH-DMRS in the target OFDM symbol, the object of performing a pilot demodulation for a PBCH in the NR SS block according to the DMRS is achieved, thereby improving the performance of channel estimation.

Optionally, the Step 101 includes: using at least one of the OFDM symbol occupied by the PSS in the NR SS block, the OFDM symbol occupied by the SSS in the NR SS block, and the OFDM symbol occupied by the PBCH in the NR SS block as the target OFDM symbol.

Optionally, one OFDM symbol occupied by the PSS in the NR SS block and/or one OFDM symbol occupied by the SSS in the NR SS block are/is used as the target OFDM symbol; or one or more OFDM symbols occupied by the PBCH in the NR SS block are used as the target OFDM symbol; or one OFDM symbol occupied by the PSS in the NR SS block and one OFDM symbol occupied by the PBCH in the NR SS block are used as the target OFDM symbol; or one OFDM symbol occupied by the SSS in the NR SS block and one OFDM symbol occupied by the PBCH in the NR SS block are used as the target OFDM symbol.

Specifically, as shown in FIG. 2a, FIG. 2b, FIG. 2c, and FIG. 2d, one OFDM symbol occupied by the PSS and one OFDM symbol occupied by the SSS are used as the target OFDM symbol. In this case, the NR-PBCH has the largest number of resource elements (RE), and two columns of pilots may assist in Doppler estimation.

As shown in FIG. 3a, FIG. 3b, FIG. 3c, and FIG. 3d, one OFDM symbol occupied by the SSS is used as the target OFDM symbol. In this case, the NR-PBCH has the largest number of REs, and with one column of pilots, a computing amount of NR-PBCH-DMRS channel estimation is minimized.

Figure 4A:
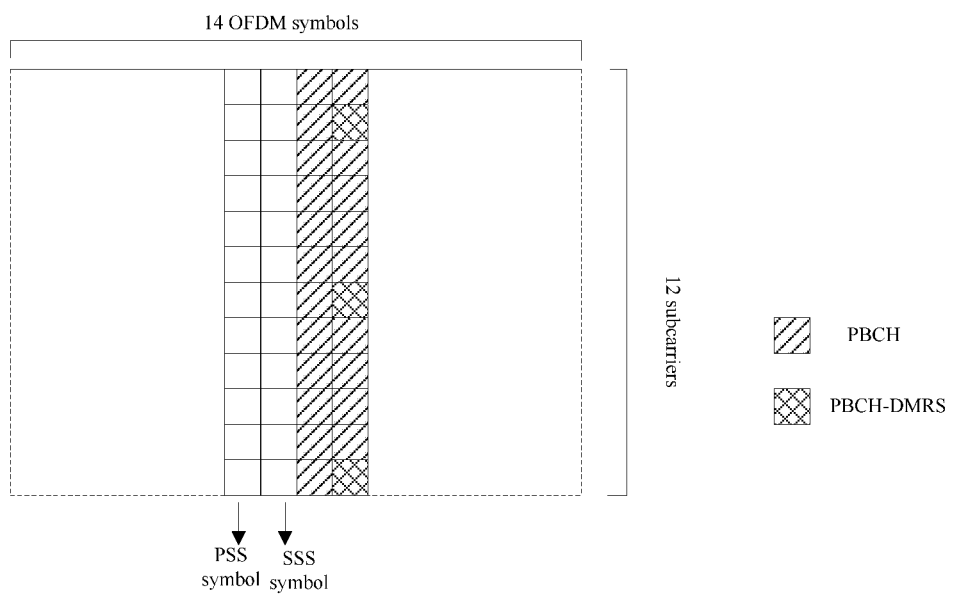
FIG. 4a is a schematic diagram of mapping a PBCH-DMRS according to some other embodiments of the present disclosure.
Figure 4B:
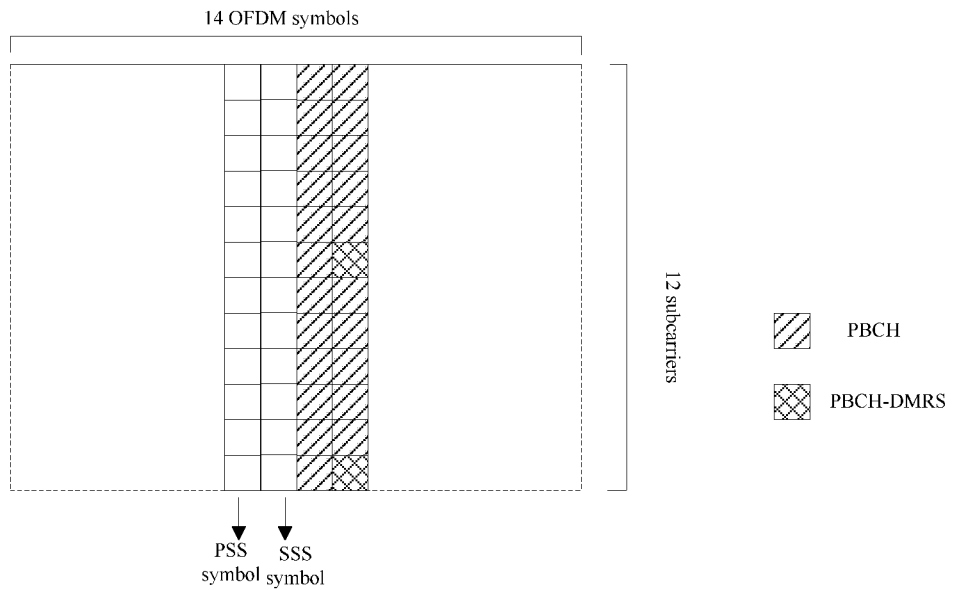
FIG. 4b is a schematic diagram of mapping a PBCH-DMRS according to some other embodiments of the present disclosure.
Figure 4C:
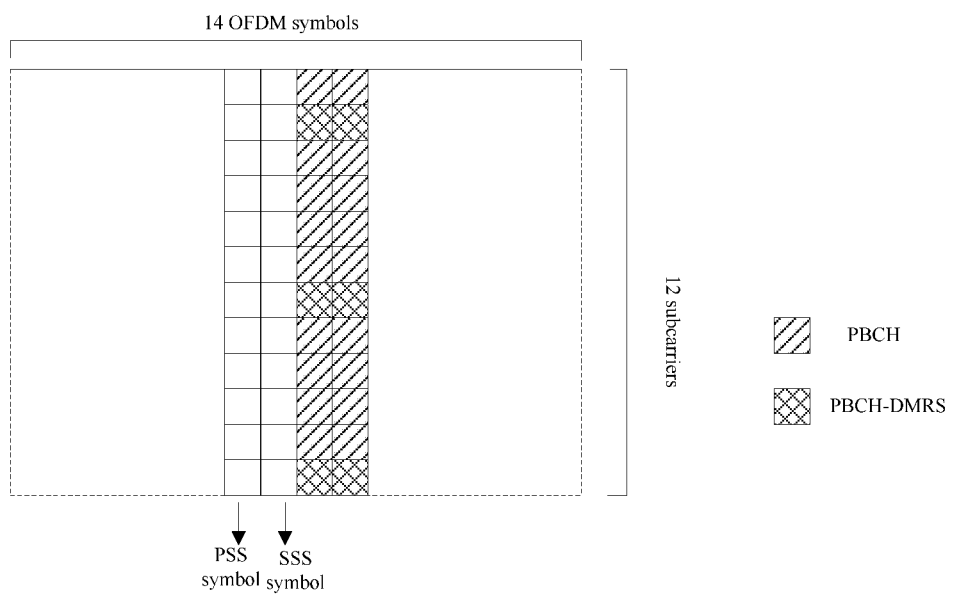
FIG. 4c is a schematic diagram of mapping a PBCH-DMRS according to some other embodiments of the present disclosure.
Figure 4D:
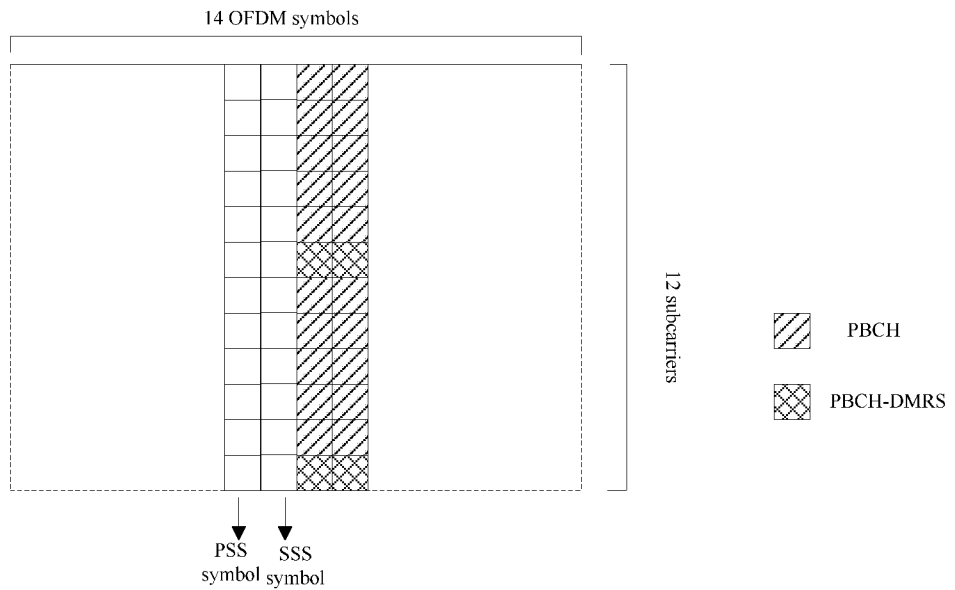
FIG. 4d is a schematic diagram of mapping a PBCH-DMRS according to some other embodiments of the present disclosure.
Figure 4E:
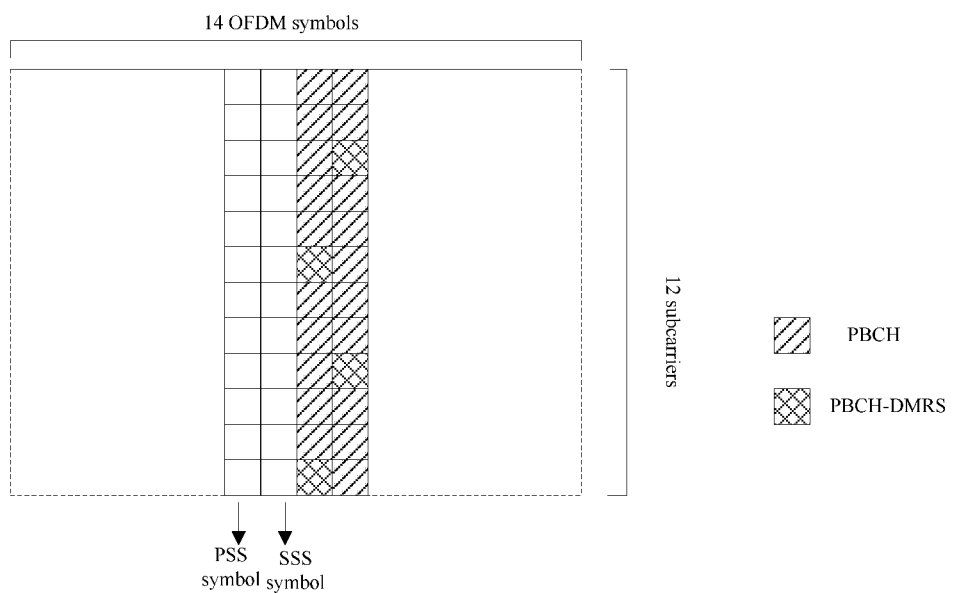
FIG. 4e is a schematic diagram of mapping a PBCH-DMRS according to some other embodiments of the present disclosure.

As shown in FIG. 4a and FIG. 4b, one OFDM symbol occupied by the PBCH is used as the target OFDM symbol. As shown in FIG. 4c, FIG. 4d, and FIG. 4e, two OFDM symbols occupied by the PBCH are used as the target OFDM symbol. In this case, unoccupied resources are maximized in number and may be used to transmit other physical channels or physical signals.

Figure 5A:
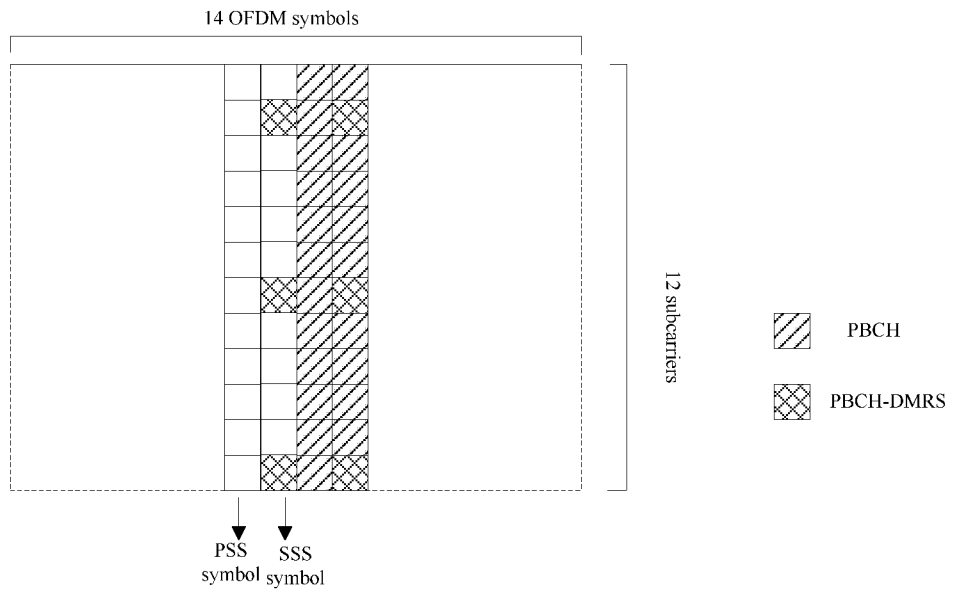
FIG. 5a is a schematic diagram of mapping a PBCH-DMRS according to some other embodiments of the present disclosure.
Figure 5B:
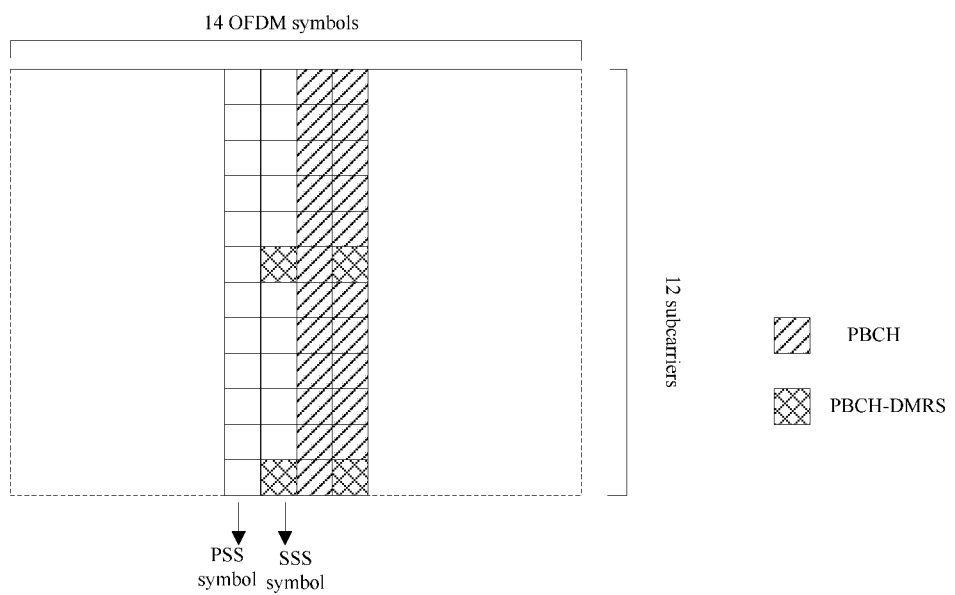
FIG. 5b is a schematic diagram of mapping a PBCH-DMRS according to some other embodiments of the present disclosure.
Figure 5C:
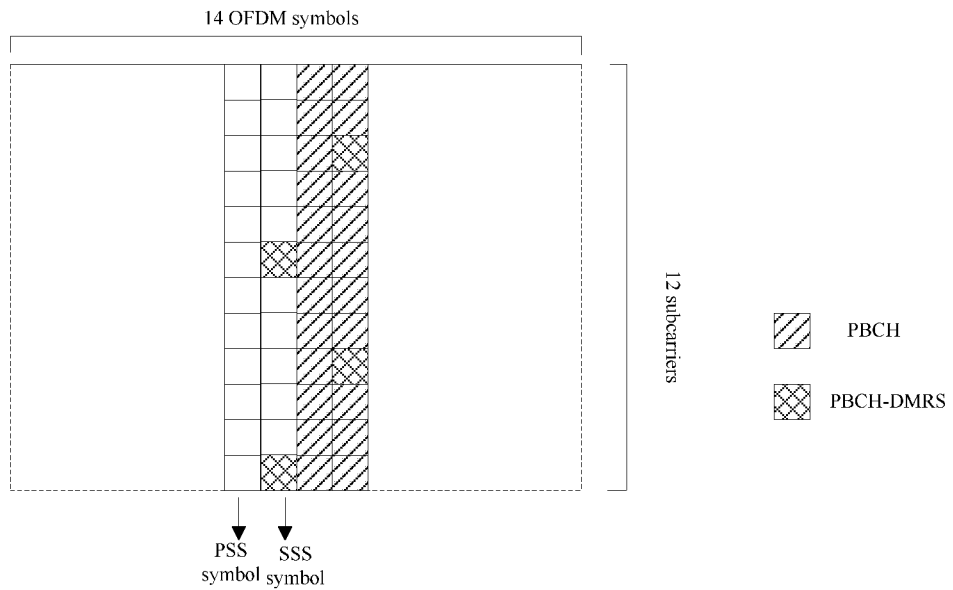
FIG. 5c is a schematic diagram of mapping a PBCH-DMRS according to some other embodiments of the present disclosure.

As shown in FIG. 5a, FIG. 5b, and FIG. 5c, one OFDM symbol occupied by the SSS and one OFDM symbol occupied by the PBCH are used as the target OFDM symbol.

Optionally, the Step 102 includes: selecting one set of subcarriers in each target OFDM symbol to map the PBCH-DMRS, where each set of subcarriers includes a preset number of subcarriers, and a frequency interval between two adjacent subcarriers of the preset number of subcarriers is a preset frequency threshold.

Herein, the preset number may be specifically 2 or 3. Specifically, as shown in FIG. 2a, FIG. 2b, FIG. 3a, FIG. 3b, FIG. 4a, FIG. 4c, and FIG. 5a, three subcarriers are selected. In FIG. 2c, FIG. 2d, FIG. 3c, FIG. 3d, FIG. 4b, FIG. 4d, FIG. 4e, FIG. 5b, and FIG. 5c, two subcarriers are selected.

In the embodiments of the present disclosure, subcarriers in different target OFDM symbols occupy the same frequency domain resource or different frequency domain resources. As shown in FIG. 5b, subcarriers in different target OFDM symbols occupy the same frequency domain resource. As shown in FIG. 5c, subcarriers in different target OFDM symbols occupy different frequency domain resources.

In addition, when there are two columns of pilots, two pilot REs adjacent in the time direction may be time division multiplexed (TDM), TDM+code division multiplexed (CDM) or TDM+frequency division multiplexed (FDM). Specifically, if the PBCH-DMRS includes two adjacent REs in a time domain, a mapping manner of TDM, TDM+CDM or TDM+FDM is used.

Optionally, during the selecting of one set of subcarriers in each target OFDM symbol to map the PBCH-DMRS, frequency domain locations of each set of subcarriers are determined by using the following steps: in each target OFDM symbol, determining a frequency domain location of a first subcarrier in each set of subcarriers according to a cell ID; and determining frequency domain locations of subcarriers other than the first subcarrier in each set of subcarriers according to the frequency domain location of the first subcarrier and the preset frequency threshold.

Optionally, if the target OFDM symbol is an OFDM symbol occupied by a synchronization signal, the synchronization signal includes a PSS and/or an SSS; the selecting one set of subcarriers in each target OFDM symbol to map the PBCH-DMRS includes: selecting one set of subcarriers to which the synchronization signal is not mapped in each target OFDM symbol to map the PBCH-DMRS.

Specifically, if the target OFDM symbol is the OFDM symbol occupied by the PSS, one set of subcarriers to which the PSS is not mapped are selected in the target OFDM symbol. If the target OFDM symbol is the OFDM symbol occupied by the SSS, one set of subcarriers to which the SSS is not mapped are selected in the target OFDM symbol. If the target OFDM symbol is the OFDM symbol occupied by the PSS and the OFDM symbol occupied by the SSS, one set of subcarriers to which the PSS is not mapped are selected in the OFDM symbol occupied by the PSS and one set of subcarriers to which the SSS is not mapped are selected in the OFDM symbol occupied by the SSS.

Each set of subcarriers includes the preset number of subcarriers, and a frequency interval between two adjacent subcarriers of the preset number of subcarriers is a preset frequency threshold. The preset number of subcarriers may be specifically all or some subcarriers, for example, two or three subcarriers, to which the synchronization signal is not mapped in the target OFDM symbol.

Herein, the PBCH-DMRS is not mapped to REs to which the NR-PSS and the NR-SSS are mapped. To be specific, when there is a contention between the NR-PSS/NR-SSS and the PBCH-DMRS, the NR-PSS/NR-SSS is preferentially mapped.

Figure 6A:
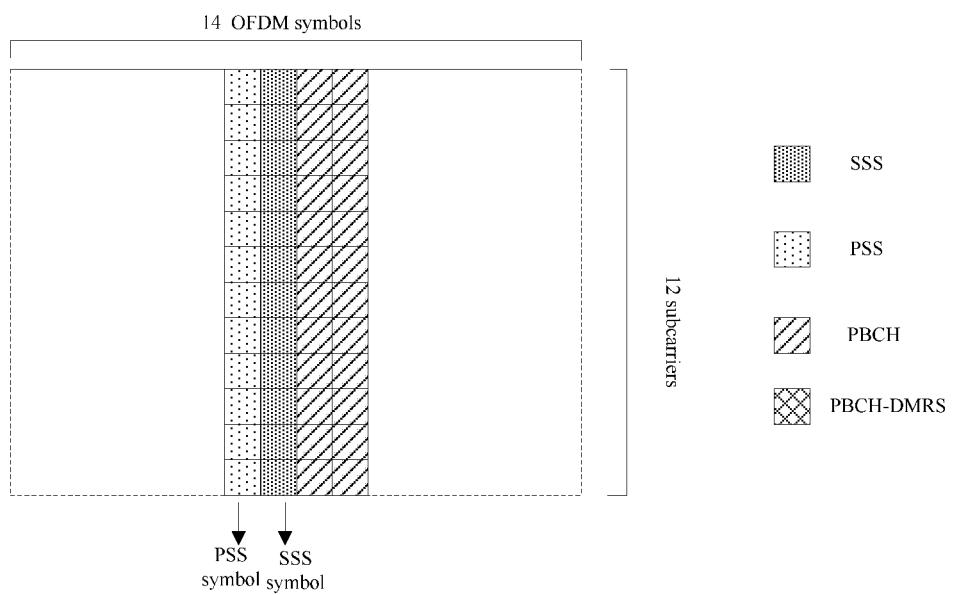
FIG. 6a is a schematic diagram of mapping a PBCH-DMRS according to some other embodiments of the present disclosure.
Figure 6B:
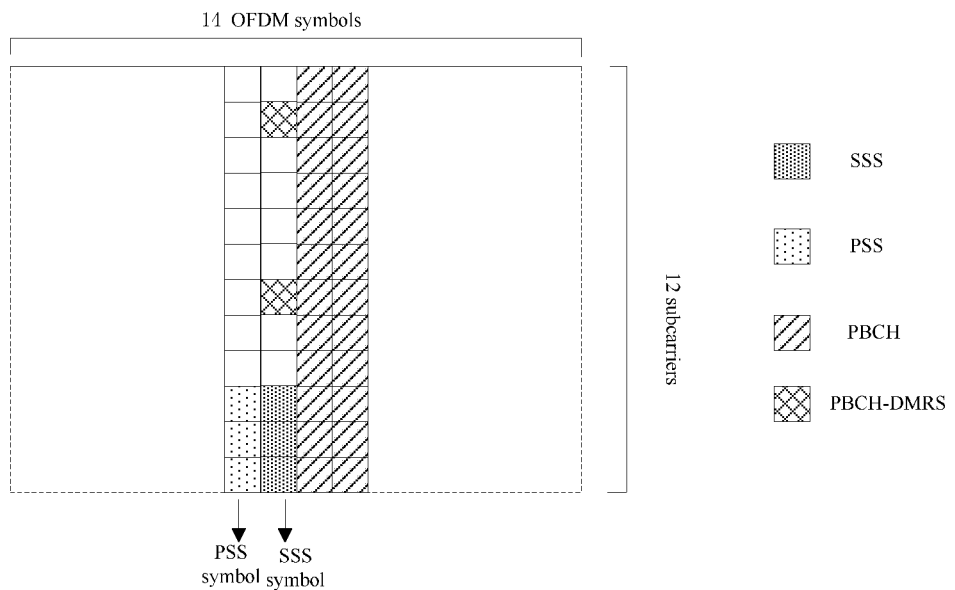
FIG. 6b is a schematic diagram of mapping a PBCH-DMRS according to some other embodiments of the present disclosure.
Figure 6C:
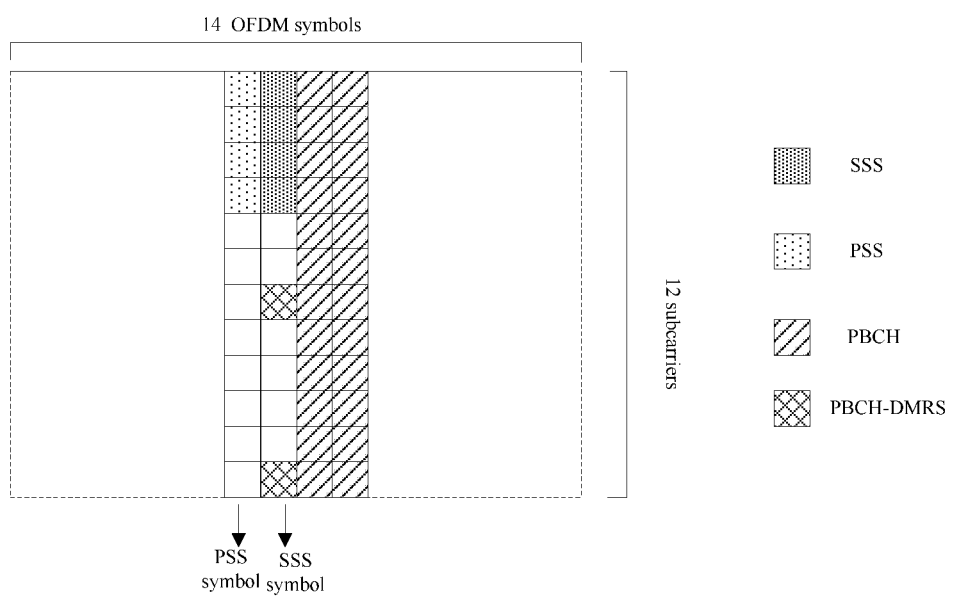
FIG. 6c is a schematic diagram of mapping a PBCH-DMRS according to some other embodiments of the present disclosure.

FIG. 6a, FIG. 6b, and FIG. 6c show schemes in which an NR-PBCH pilot does not occupy an OFDM symbol of the NR-PBCH. In FIG. 6a, since there is no subcarrier to which the NR-PSS is not mapped in a symbol in which the NR-PSS is mapped, and there is no subcarrier to which the NR-SSS is not mapped in a symbol in which the NR-SSS is mapped, an NR-PBCH-DMRS is not mapped in the symbol occupied by the NR-PSS or the symbol occupied by the NR-SSS. FIG. 6b and FIG. 6c show schemes in which the NR-PBCH-DMRS is only transmitted within an OFDM symbol in which the NR-SSS resides. In FIG. 6b and FIG. 6c, two subcarriers to which the NR-SSS is not mapped are selected in the symbol occupied by the NR-SSS, and the NR-PBCH-DMRS is mapped to the two selected subcarriers, thereby making full use of resources of the OFDM symbol occupied by the NR-SSS.

Figure 6D:
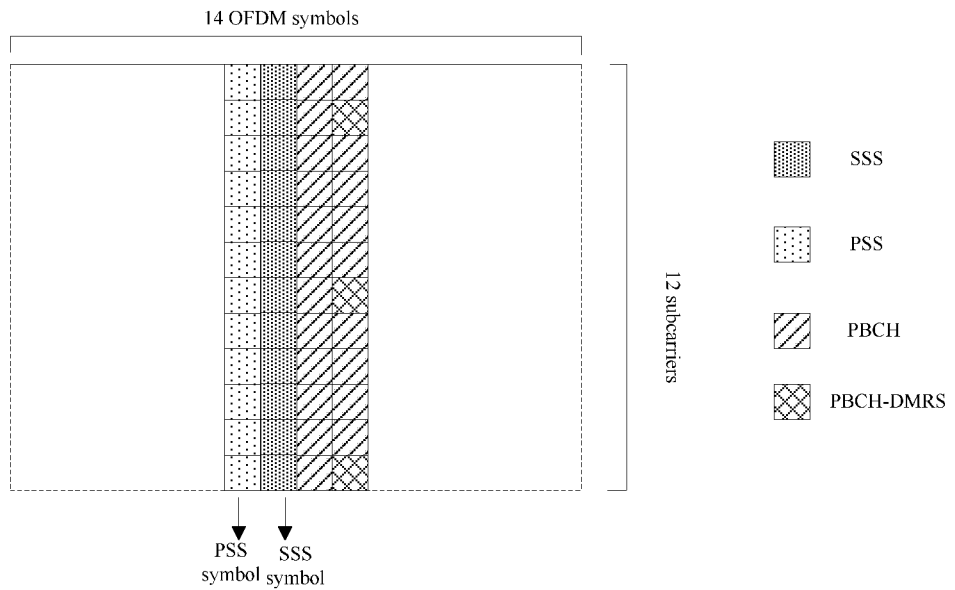
FIG. 6d is a schematic diagram of mapping a PBCH-DMRS according to some other embodiments of the present disclosure.
Figure 6E:
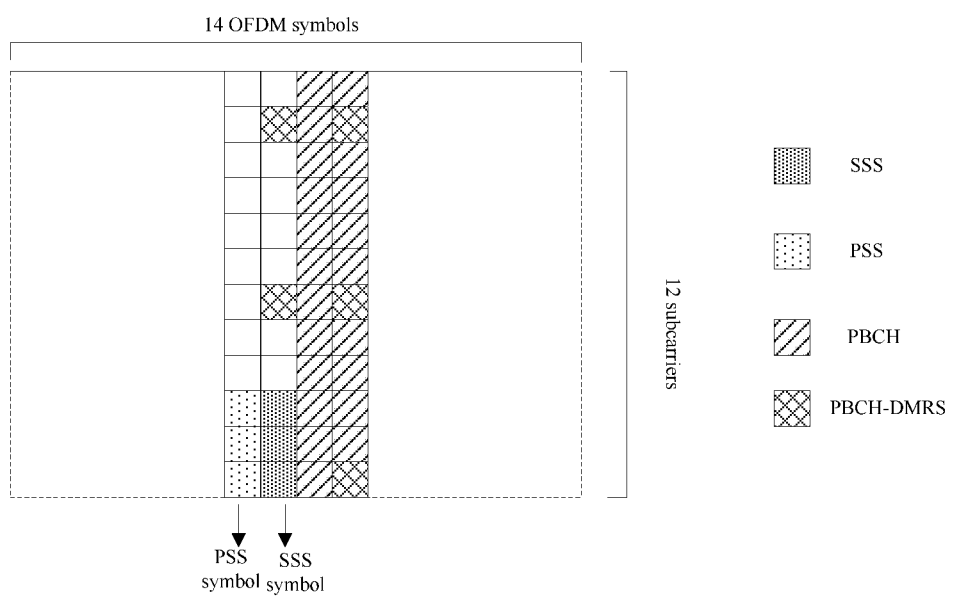
FIG. 6e is a schematic diagram of mapping a PBCH-DMRS according to some other embodiments of the present disclosure.
Figure 6F:
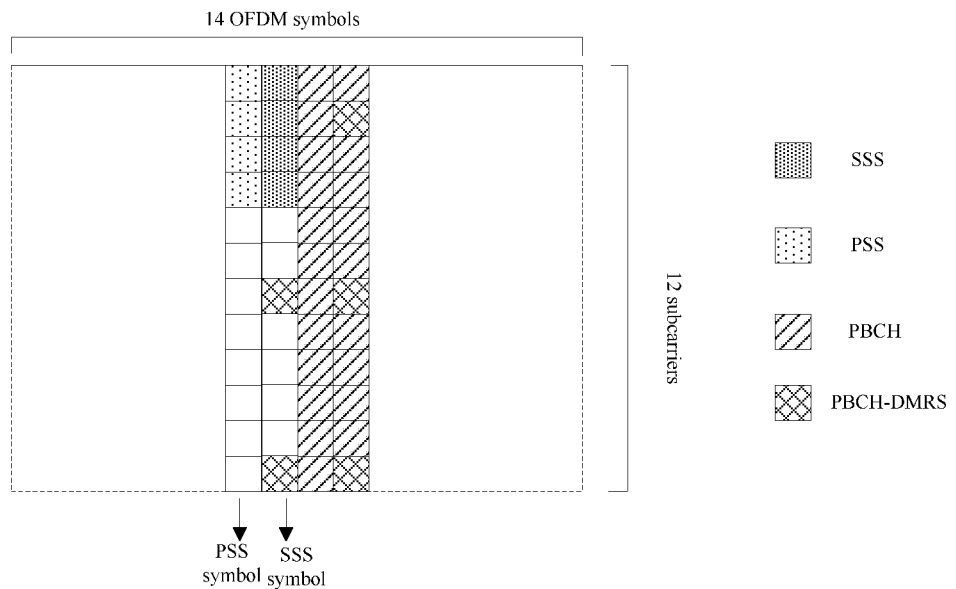
FIG. 6f is a schematic diagram of mapping a PBCH-DMRS according to some other embodiments of the present disclosure.

In FIG. 6d, there is no subcarrier to which the NR-PSS is not mapped in the symbol in which the NR-PSS is mapped, and there is no subcarrier to which the NR-SSS is not mapped in the symbol in which the NR-SSS is mapped. In this case, the NR-PBCH-DMRS is mapped in a symbol occupied by the NR-PBCH. In FIG. 6e and FIG. 6f, two subcarriers to which the NR-SSS is not mapped are selected in the symbol occupied by the NR-SSS, three subcarriers are selected in the symbol occupied by the NR-PBCH, and the NR-PBCH-DMRS is mapped to the selected subcarriers.

In the resource mapping method for a DMRS according to the embodiments of the present disclosure, a target OFDM symbol for mapping a PBCH-DMRS is determined from OFDM symbols corresponding to an SS block, and the PBCH-DMRS is mapped in the target OFDM symbol, so that pilot demodulation can be performed for a PBCH in the SS block according to the DMRS, thereby improving the performance of channel estimation.

Figure 7:
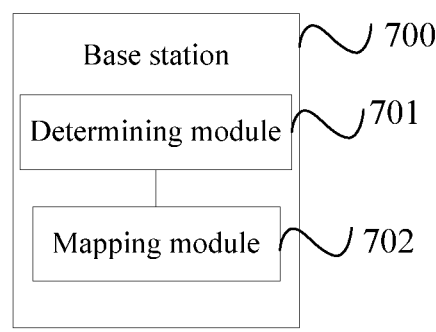
FIG. 7 is a structural block diagram of a base station according to some embodiments of the present disclosure.

As shown in FIG. 7, some embodiments of the present disclosure further provide a base station 700, including: a determining module 701, configured to determine a target OFDM symbol for mapping a PBCH-DMRS from OFDM symbols corresponding to an NR SS block; and a mapping module 702, configured to map the PBCH-DMRS in the target OFDM symbol.

In the base station according to the embodiments of the present disclosure, the determining module 701 is configured to use at least one of an OFDM symbol occupied by a PSS in the NR SS block, an OFDM symbol occupied by an SSS in the NR SS block, and an OFDM symbol occupied by the PBCH in the NR SS block as the target OFDM symbol.

In the base station according to the embodiments of the present disclosure, the determining module 701 is configured to use one OFDM symbol occupied by the PSS in the NR SS block and/or one OFDM symbol occupied by the SSS in the NR SS block as the target OFDM symbol; or configured to use one or more OFDM symbols occupied by the PBCH in the NR SS block as the target OFDM symbol; or configured to use one OFDM symbol occupied by the PSS in the NR SS block and one OFDM symbol occupied by the PBCH in the NR SS block as the target OFDM symbol; or configured to use one OFDM symbol occupied by the SSS in the NR SS block and one OFDM symbol occupied by the PBCH in the NR SS block as the target OFDM symbol.

In the base station according to the embodiments of the present disclosure, the mapping module 702 is configured to select one set of subcarriers in each target OFDM symbol to map the PBCH-DMRS, where each set of subcarriers includes the preset number of subcarriers, and a frequency interval between two adjacent subcarriers of the preset number of subcarriers is a preset frequency threshold.

Figure 8:
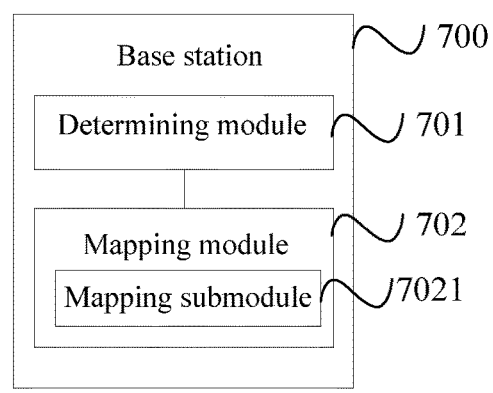
FIG. 8 is a structural block diagram of a base station according to some other embodiments of the present disclosure.

In the base station according to the embodiments of the present disclosure, if the target OFDM symbol is an OFDM symbol occupied by a synchronization signal, the synchronization signal includes a PSS and/or an SSS, as shown in FIG. 8, the mapping module 702 includes a mapping sub-module 7021, configured to select one set of subcarriers to which the synchronization signal is not mapped in each target OFDM symbol to map the PBCH-DMRS.

In the base station according to the embodiments of the present disclosure, subcarriers in different target OFDM symbols occupy the same frequency domain resource or different frequency domain resources.

It should be noted that the base station according to the embodiments of the present disclosure is a base station corresponding to the foregoing method. All implementations in the method embodiments are applicable to the embodiments of the base station and can achieve the same effect.

The base station according to the embodiments of the present disclosure determines a target OFDM symbol for mapping a PBCH-DMRS from OFDM symbols corresponding to an NR SS block, and maps the PBCH-DMRS in the target OFDM symbol, so that channel estimation can be performed for a PBCH in the SS block according to the DMRS.

Figure 9:
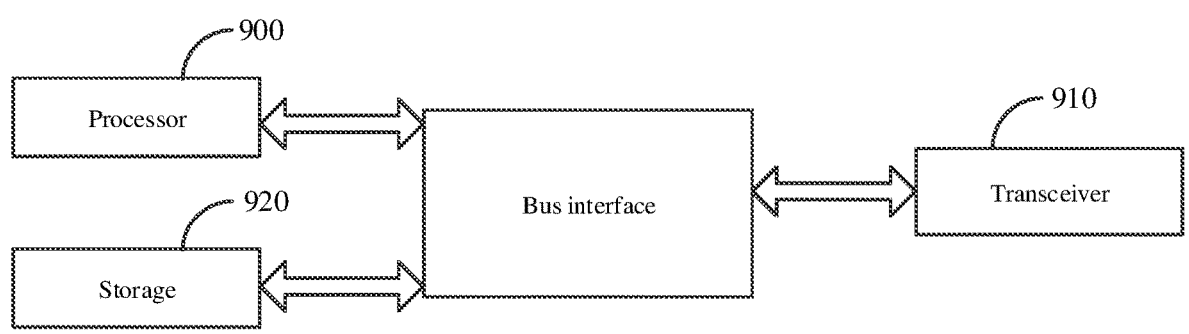
FIG. 9 is a structural block diagram of a base station according to some other embodiments of the present disclosure.

As shown in FIG. 9, in the present disclosure, to further achieve the foregoing object, as shown in FIG. 9, some other embodiments of the present disclosure further provide a base station. The base station includes a processor 900, a storage 920 connected to the processor 900 through a bus interface, and a transceiver 910 connected to the processor 900 through the bus interface. The storage 920 is configured to store a program and data used by the processor in operation. The transceiver 910 is configured to transmit data information or a pilot and receive an uplink control channel.

The processor 900 is configured to read the program in the storage 920 to perform the following process: determining a target OFDM symbol for mapping a PBCH-DMRS from OFDM symbols corresponding to an NR SS block; and mapping the PBCH-DMRS in the target OFDM symbol.

Optionally, the processor 900 is further configured to use at least one of an OFDM symbol occupied by a PSS in the NR SS block, an OFDM symbol occupied by an SSS in the NR SS block, and an OFDM symbol occupied by the PBCH in the NR SS block as the target OFDM symbol.

Optionally, the processor 900 is further configured to: use one OFDM symbol occupied by the PSS in the NR SS block and/or one OFDM symbol occupied by the SSS in the NR SS block as the target OFDM symbol; or use one or more OFDM symbols occupied by the PBCH in the NR SS block as the target OFDM symbol; or use one OFDM symbol occupied by the PSS in the NR SS block and one OFDM symbol occupied by the PBCH in the NR SS block as the target OFDM symbol; or use one OFDM symbol occupied by the SSS in the NR SS block and one OFDM symbol occupied by the PBCH in the NR SS block as the target OFDM symbol.

Optionally, the processor 900 is further configured to select one set of subcarriers in each target OFDM symbol to map the PBCH-DMRS, where each set of subcarriers includes the preset number of subcarriers, and a frequency interval between two adjacent subcarriers of the preset number of subcarriers is a preset frequency threshold.

Optionally, if the target OFDM symbol is an OFDM symbol occupied by a synchronization signal, the synchronization signal includes a PSS and/or an SSS; the processor 900 is further configured to select one set of subcarriers to which the synchronization signal is not mapped in each target OFDM symbol to map the PBCH-DMRS.

Optionally, subcarriers in different target OFDM symbols occupy the same frequency domain resource or different frequency domain resources.

In FIG. 9, a bus architecture may include any number of interconnected buses and bridges, and connects various circuits including specifically one or more processors represented by the processor 900 and storages represented by the storage 920. The bus architecture may also connect various other circuits such as peripherals, voltage regulators and power management circuits, which is well known in the art. Therefore, a detailed description thereof is omitted herein. The bus interface provides interfaces. The transceiver 910 may include a plurality of elements, that is, includes a transmitter and a transceiver, to provide units configured to communicate with various other apparatuses over a transmission medium. The processor 900 is responsible for managing the bus architecture and general processing, and the storage 920 may store data used by the processor 900 in operation.

The base station according to the embodiments of the present disclosure determines a target OFDM symbol for mapping a PBCH-DMRS from OFDM symbols corresponding to an NR SS block, and maps the PBCH-DMRS in the target OFDM symbol, so that channel estimation can be performed for a PBCH in the SS block according to the DMRS.

An embodiment of the present disclosure further provides a computer readable storage medium, storing therein a computer program, where the program is configured to be executed by a processor, to implement the following steps: determining a target OFDM symbol for mapping a PBCH-DMRS from OFDM symbols corresponding to an NR SS block; and mapping the PBCH-DMRS in the target OFDM symbol.

In addition, it should be noted that in the base station and the method of the present disclosure, apparently, parts or steps may be divided and/or recombined. The division and/or recombination should be regarded as an equivalent solutions of the present disclosure. Moreover, steps of the above series of processes may be performed naturally in a time order of description. However, the performing sequence is not limited to the time order. Some steps may be performed in parallel or independently. Persons of ordinary skill in the art would appreciate that all or any steps or parts of the methods and apparatuses of the present disclosure may be implemented in any computing apparatus (including a processor, a storage medium or the like) or a network of computing apparatuses in hardware, firmware, software or a combination thereof, and this can be achieved by persons of ordinary skill in the art by using their basic programming skill after reading the description of the present disclosure.

Thus, the object of the present disclosure may also be implemented by running a program or a set of programs on any computing apparatus. The computing apparatus may be a known general purpose apparatus. Thus, the object of the present disclosure may also be implemented merely by providing a program product which contains program code for implementing the methods or apparatuses. That is, such program product also constitutes the present disclosure, and a storage medium in which such a program product is stored also constitutes the present disclosure. Apparently, the storage medium may be any known storage medium or any storage medium that will be developed in the future. It should also be noted that, in the apparatuses and methods of the present disclosure, apparently, parts or steps may be divided and/or recombined. The division and/or recombination should be regarded as an equivalent solutions of the present disclosure. Moreover, steps of the above method may be performed naturally in a time order of description, however the performing sequence is not limited to the time order. Some steps may be performed in parallel or independently.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A resource mapping method for a demodulation reference signal (DMRS), comprising:
    determining a target orthogonal frequency division multiplexing (OFDM) symbol for mapping a physical broadcast channel (PBCH)-DMRS from OFDM symbols corresponding to a new radio (NR) synchronization signal block (SS block), wherein a PBCH and a primary synchronization signal (PSS) in the NR SS block are located in different OFDM symbols;
    mapping the PBCH-DMRS in the target OFDM symbol;
    wherein the determining the target OFDM symbol for mapping the PBCH-DMRS from the OFDM symbols corresponding to the NR SS block comprises:
    using at least one of an OFDM symbol in which the PSS in the NR SS block is located or an OFDM symbol in which a secondary synchronization signal (SSS) in the NR SS block is located as the target OFDM symbol;
    wherein the mapping the PBCH-DMRS in the target OFDM symbol comprises:
    selecting one set of subcarriers that are unoccupied in each of the target OFDM symbol in which a synchronization signal is located to map the PBCH-DMRS, wherein the synchronization signal comprises the PSS and/or the SSS.

2. The resource mapping method for the DMRS according to claim 1, wherein the using the at least one of the OFDM symbol in which the PSS in the NR SS block is located and the OFDM symbol in which the SSS in the NR SS block is located as the target OFDM symbol comprises:
    using one OFDM symbol in which the PSS in the NR SS block is located and/or one OFDM symbol in which the SSS in the NR SS block is located as the target OFDM symbol; or
    using one OFDM symbol in which the PSS in the NR SS block is located and one OFDM symbol occupied by the PBCH in the NR SS block as the target OFDM symbol; or
    using one OFDM symbol in which the SSS in the NR SS block is located and one OFDM symbol occupied by the PBCH in the NR SS block as the target OFDM symbol.

3. The resource mapping method for the DMRS according to claim 1, wherein each set of subcarriers comprises a preset number of subcarriers, and a frequency interval between two adjacent subcarriers of the preset number of subcarriers is a preset frequency threshold.

4. The resource mapping method for the DMRS according to claim 3, wherein subcarriers in different target OFDM symbols occupy a same frequency domain resource.

5. The resource mapping method for the DMRS according to claim 3, wherein subcarriers in different target OFDM symbols occupy different frequency domain resources.

6. A base station, comprising: a storage, a processor, and a computer program stored in the storage and configured to be executed by the processor, wherein the processor is configured to execute the computer program, to implement following steps:
    determining a target orthogonal frequency division multiplexing (OFDM) symbol for mapping a physical broadcast channel (PBCH)-demodulation reference signal (DMRS) from OFDM symbols corresponding to a new radio (NR) synchronization signal block (SS block), wherein a PBCH and a primary synchronization signal (PSS) in the NR SS block are located in different OFDM symbols;
    mapping the PBCH-DMRS in the target OFDM symbol;
    wherein the determining the target OFDM symbol for mapping the PBCH-DMRS from the OFDM symbols corresponding to the NR SS block comprises:
    using at least one of an OFDM symbol in which the PSS in the NR SS block is located or an OFDM symbol in which a secondary synchronization signal (SSS) in the NR SS block is located as the target OFDM symbol;
    wherein the mapping the PBCH-DMRS in the target OFDM symbol comprises:
    selecting one set of subcarriers that are unoccupied in each of the target OFDM symbol in which a synchronization signal is located to map the PBCH-DMRS, wherein the synchronization signal comprises the PSS and/or the SSS.

7. The base station according to claim 6, wherein the processor is further configured to execute the computer program, to implement following step:
    using one OFDM symbol in which the PSS in the NR SS block is located and/or one OFDM symbol in which the SSS in the NR SS block is located as the target OFDM symbol; or
    using one OFDM symbol in which the PSS in the NR SS block is located and one OFDM symbol occupied by the PBCH in the NR SS block as the target OFDM symbol; or
    using one OFDM symbol in which the SSS in the NR SS block is located and one OFDM symbol occupied by the PBCH in the NR SS block as the target OFDM symbol.

8. The base station according to claim 6, wherein each set of subcarriers comprises a preset number of subcarriers, and a frequency interval between two adjacent subcarriers of the preset number of subcarriers is a preset frequency threshold.

9. The base station according to claim 8, wherein subcarriers in different target OFDM symbols occupy a same frequency domain resource.

10. The base station according to claim 8, wherein subcarriers in different target OFDM symbols occupy different frequency domain resources.

11. A non-transitory computer readable storage medium, storing therein a computer program, wherein the program is configured to be executed by a processor, to implement following steps:
    determining a target orthogonal frequency division multiplexing (OFDM) symbol for mapping a physical broadcast channel (PBCH)-demodulation reference signal (DMRS) from OFDM symbols corresponding to a new radio (NR) synchronization signal block (SS block), wherein a PBCH and a primary synchronization signal (PSS) in the NR SS block are located in different OFDM symbols;
    mapping the PBCH-DMRS in the target OFDM symbol;
    wherein the determining the target OFDM symbol for mapping the PBCH-DMRS from the OFDM symbols corresponding to the NR SS block comprises:
    using at least one of an OFDM symbol in which the PSS in the NR SS block is located or an OFDM symbol in which a secondary synchronization signal (SSS) in the NR SS block is located as the target OFDM symbol;
    wherein the mapping the PBCH-DMRS in the target OFDM symbol comprises:

selecting one set of subcarriers that are unoccupied in each of the target OFDM symbol in which a synchronization signal is located to map the PBCH-DMRS, wherein the synchronization signal comprises the PSS and/or the SSS.

12. The non-transitory computer readable storage medium according to claim 11, wherein the program is configured to be executed by a processor, to implement following step:

using one OFDM symbol in which the PSS in the NR SS block is located and/or one OFDM symbol in which the SSS in the NR SS block is located as the target OFDM symbol; or using one OFDM symbol in which the PSS in the NR SS block is located and one OFDM symbol occupied by the PBCH in the NR SS block as the target OFDM symbol; or using one OFDM symbol in which the SSS in the NR SS block is located and one OFDM symbol occupied by the PBCH in the NR SS block as the target OFDM symbol.

13. The non-transitory computer readable storage medium according to claim 11, wherein each set of subcarriers comprises a preset number of subcarriers, and a frequency interval between two adjacent subcarriers of the preset number of subcarriers is a preset frequency threshold.

14. The non-transitory computer readable storage medium according to claim 13, wherein subcarriers in different target OFDM symbols occupy a same frequency domain resource.

15. The non-transitory computer readable storage medium according to claim 13, wherein subcarriers in different target OFDM symbols occupy different frequency domain resources.

* * * * *